United States Patent [19]
O'Dell

[11] 3,798,622
[45] Mar. 19, 1974

[54] BINARY MEMORY DEVICES

[75] Inventor: Thomas Henry O'Dell, London, England

[73] Assignee: National Research Development Corporation, London, England

[22] Filed: June 28, 1972

[21] Appl. No.: 267,058

[30] Foreign Application Priority Data
July 12, 1971 Great Britain .................... 32624/71

[52] U.S. Cl....340/174 FT, 340/174 M, 340/174 VA, 340/174 YC
[51] Int. Cl. ........................ G11c 11/14, G11c 11/42
[58] Field of Search ............................... 340/174 TF

[56] References Cited

UNITED STATES PATENTS 3,701,115 2/1971 Ingrey .......................... 340/174 TF

OTHER PUBLICATIONS

IBM Technical Disclosure Bulletin–Vol. 13, No. 2, July 1970, pg. 498–499
IBM Technical Disclosure Bulletin–Vol. 13, No. 5, Oct. 1970, pg. 1,187–1,188

*Primary Examiner*—James W. Moffitt
*Attorney, Agent, or Firm*—Cushman, Darby & Cushman

[57] ABSTRACT

A memory device consists of a material containing bubble domains, the state of the memory being determined by the polarity of the bubble domains. Use of a transparent material containing bubble domains is described, read-out being obtained from an image of the domains formed in polarised light.

5 Claims, 10 Drawing Figures

BINARY MEMORY DEVICES

This invention relates to binary memory devices and is particularly concerned with devices in which a sheet of material is divided into discrete areas each of which is capable of storing a binary digit.

There are many circumstances in which a material can exist in two stable states side by side. For example an alloy of noneutectic composition will have a range of temperatures over which it is partly solid and partly liquid. Another example is an anisotropic magnetic material which, when unmagnetised overall, consists of a series of zones magnetised in the easy direction with one or the other polarity.

The various zones of such materials, existing in one or other of the two states are hereinafter referred to as domains. Such materials commonly exist with isolated domains of one state existing in what is effectively a continuous domain of the other state extending throughout the whole of the material or of a large region of it. The state taken up by the continuous domain is determined by the previous history of the material. It is an object of the invention to exploit this phenomenon to provide a binary memory.

According to the invention, a memory device comprises a material existing in two stable states side by side and having a plurality of isolated domains of one of said states in a continuous domain of the other state and capable of existing with either state forming the continuous domain, selectively operable means operative in discrete areas for causing the material in a predetermined one of said states to form the continuous domain, and detector means for determining whether the continuous domain or the isolated domains have a predetermined state.

According to a preferred form of the invention, a memory device comprises a sheet of magnetic material having an easy direction of magnetisation normal to the surface of the sheet and having a plurality of isolated domains of one polarity in a continuous domain of the opposite polarity, means for selectively applying a magnetic field to discrete areas of said material, and detector means for determining whether the continuous domain or the isolated domain have a predetermined polarity in each such area.

Preferably the material is transparent and the detector means comprises means for projecting an image in polarized light of a discrete area on to a photoconductive sheet or an array of photodiodes and means for detecting whether the electrical resistance across said sheet or said array of diodes exceeds a threshold value.

An embodiment of the invention will now be described by way of example with reference to the accompanying drawings, in which.

The embodiments of the invention which are to be described all employ a slice of $Y_3 Ga_1 Fe_4 O_{12}$ 100 microns thick with the easy direction of magnetisation normal to the surface of the slice. Except where otherwise specified, it is immaterial whether the slice is a single crystal or is polycrystalline. If such a slice is viewed in polarized light with the polarisers adjusted to give maximum contrast, the domain of one magnetic polarity appears light and the domains of opposite magnetic polarity appear dark. It will be appreciated that, since in the absence of an applied magnetic field, the slice has overall zero magnetisation, the area of the parts of the slice which appears light will be equal to the area of the parts thereof which appears dark. As will be described hereinafter, all the embodiments of the invention which are to be described involve viewing such a slice in polarized light and it should be understood that the polarisers are initially set to give maximum contrast and then left in this setting.

Figure 1:
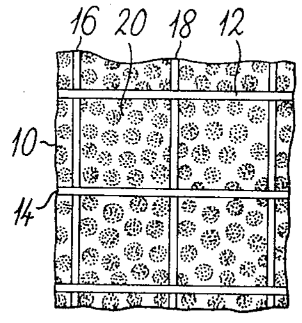
FIG. 1 is a plan view of part of a magnetic memory in accordance with the invention with a first of the two states forming the continuous domain.

FIG. 1 shows a fragment of a slice of magnetic material 10 forming a memory in accordance with the invention.

A matrix of wires, such as the wires 12, 14 16 and 18, are disposed on the surface of the magnetic material so that a magnetic field may be applied to a selected area of the memory by coincident-current addressing. It will be observed that the magnetic material comprises a number of isolated domains which appear dark in a continuous domain which appears light.

Figure 2:
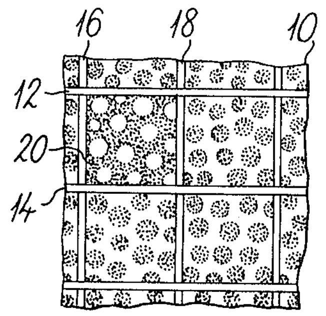
FIG. 2 is a plan view, similar to FIG. 1, but with the second state forming the continuous domain.

If electric currents are passed through the wires 12, 14, 16 and 18 in directions so as to produce a magnetic field of the same polarity as that in the domains which appear dark and the magnetic field is of a sufficient intensity for the size of the dark domains to increase to such an extent that adjacent domains make contact with one another and the magnetising currents are then removed, the area 20 of the magnetic material takes up the appearance shown in FIG. 2, namely, a continuous domain which appears dark containing a number of isolated domains which appear light. The appearance of adjacent domains is unaltered despite the fact that these were subjected to magnetic fields produced by some but not all of the conductors 12, 14, 16 and 18. These domains have returned to their original state when the magnetising electric currents were removed.

Figure 3:
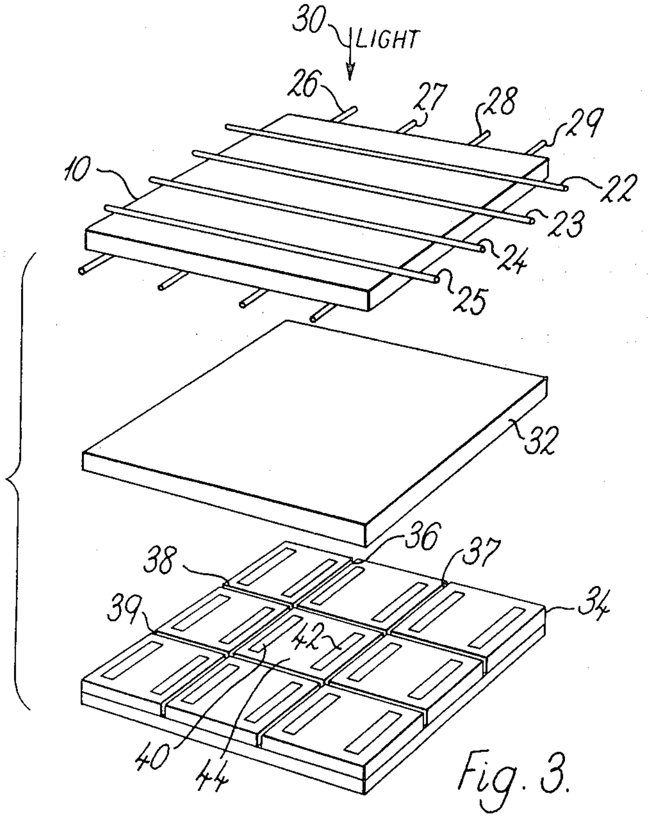
FIG. 3 is a exploded view of an optical readout arrangement suitable for use in any one of the memories illustrated in FIGS. 1, 2 and 6–10.

FIG. 3 illustrates an arrangement for reading-out from the memory formed by the magnetic material 10. In FIG. 3, the material 10 is shown as having conductors to define an array of nine separate memory areas. It should be appreciated that, in practice, a much larger number of discrete areas would be accommodated on a single slice of magnetic material. It will be observed that the conductors 22 to 25 extending in one direction are disposed on the upper surface of the slice of magnetic material 10 while the conductors 26 to 29 which are disposed at right angles to the first mentioned conductors 22 to 25, are disposed on the underside of the magnetic material 10. This will be a convenient arrangement to adopt in practice since the material itself will then form the necessary insulation at the intersections of the conductors.

In use, plane polarized light is incident on the slice of magnetic material 10 in the direction indicated by the arrow 30. The light transmitted through the slice 10 then passes through a polariser 32 and is thence incident on a sheet of photoconductive material 34. As already described, the polariser 32 is oriented to give maximum contrast when the sheet of magnetic material 10 is in an initial unmagnetised state.

The upper surface of the sheet of photoconductive material 34 is divided into nine separate areas corresponding to the nine areas of the magnetic material 10 by four strips of opaque material 36 to 39. This ensures that the photoconductive material under the strips cannot be energised and consequently the nine discrete areas on the surface of the photoconductive sheet 34 remain electrically isolated from one another.

Each of the discrete areas on the surface of the photoconductive slice 34 has a pair of electrodes such as the electrodes 40 and 42 of the central area 44.

Figure 4:
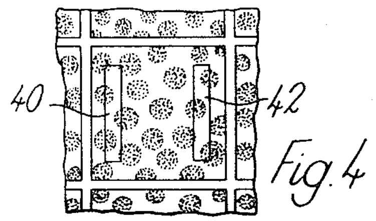
FIG. 4 is a plan view of one of the components of the arrangement shown in FIG. 8 when the memory is in a first state.

FIG. 4 shows part of the surface of the photoconductive slice 34 with an image of the magnetic material in the state shown in FIG. 1 projected on to it. The dark areas of the image are isolated and are surrounded by a continuous light area. The light areas, of course, become electrically conductive and consequently the electrical resistance between the two electrodes 40 and 42 is low.

Figure 5:
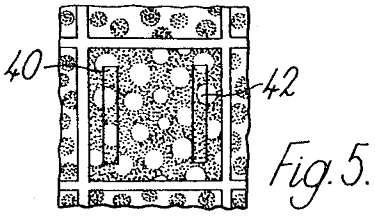
FIG. 5 is a plan view, similar to FIG. 4 but with the memory in the opposite state.

FIG. 5 shows the area 44 after a magnetic field has been applied to cause the dark area to become continuous and the light areas to be isolated. There is now no continuous conductive area of the photoconductive slice 34 between the two electrodes 40 and 42 and consequently the electrical resistance is high. Thus the state of a particular area of the memory can be determined by determining whether the electrical resistance between the corresponding set of electrodes on the photoconductive slice 34 exceeds a threshold value.

If the material is a perfect crystal, then provided the magnitude and duration of the applied magnetic field is such that the domain boundaries move with their limiting velocity, the domain pattern will be preserved even after repeated switching. However, if, for example, due to crystal imperfections, the mean velocity of part of a domain boundary is reduced compared with that of other parts of the boundary of such domain, repeated switching will cause such domain boundaries to migrate so that adjacent domains run together into stripes. It will be apparent that for the read-out arrangement described with reference to FIGS. 3, 4 and 5 to work satisfactorily, it is necessary for there to be a relatively large number of isolated domains per discrete area and, if the size of the domain is increased, this decreases the number of discrete areas which can be provided on a slice of a particular size. Consequently, it is desirable to prevent migration of the domain boundaries so far as possible.

Figure 6:
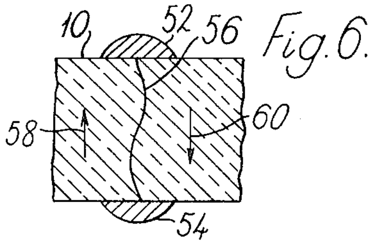
FIG. 6 is a sectional view of a part of a magnetic memory illustrating means for inhibiting migration of the domain boundaries.

Referring to FIG. 6, one way of doing this is to deposit an array of dots of a ferromagnetic material such as 'Permaloy' on one or both surfaces of the slice 10. In FIG. 6, a pair of such dots 52 and 54 are shown on opposite sides of the material. In FIG. 6, a domain boundary 56 is shown as having aligned itself between the two dots. This has happened because the dots of Permaloy 52 and 54 effectively reduce the 'air gap' between adjacent domains which are, of course, magnetised in opposite directions as indicated by the arrows 58 and 60.

Figure 7:
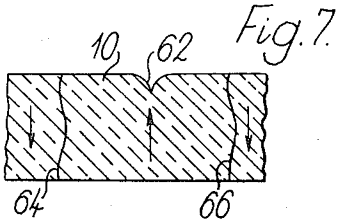
FIG. 7 is a sectional view, similar to FIG. 6, illustrating an alternative method of inhibiting migration of the domain boundaries.

Referring to FIG. 7, an alternative arrangement is to etch or scribe a lattice on to one or both surfaces of the slice 10. A scribed line 62 on one surface is shown in FIG. 7. The two domain boundaries 64 and 66 shown in FIG. 7 have tended to form at some distance from the line 62 since the depression formed thereby has the effect of increasing the 'air gap' between adjacent domains.

An alternative way of inhibiting domain boundary migration is to form the slice 10 of a polycrystalline magnetic material having a large number of grains for each domain. Since domain boundaries tend not to cross grain boundaries, migration of grain boundaries is limited.

Figure 8:
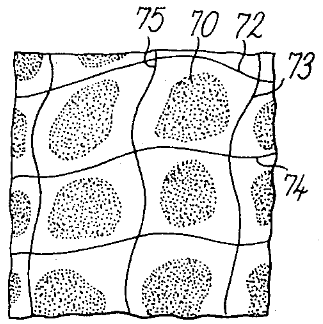
FIG. 8 is a plan view of a part of a magnetic memory in accordance with the invention formed from a polycrystalline material having grain size of the same order of magnitude as that of the isolated domain, with a first state forming the continuous domain.

Yet another expedient is to use polycrystalline material having grain size such that there is approximately one grain for each isolated domain. A fragment of such material is shown in FIG. 8 where, for example, the isolated domain 70 is in a grain surrounded by grain boundaries 72, 73, 74 and 75. When a suitable magnetic field is applied, the domain 70, along with the other isolated domains tends to expand to touch the adjoining grain boundaries. If the grain boundaries were not present, the fragments of the former continuous domains located at the corners of the various grains would coalesce to form isolated domains. However, since these domains would be intersected by grain boundaries, instead, the new isolated domains migrate towards the centres of the various grains as shown in FIG. 10.

Figure 9:
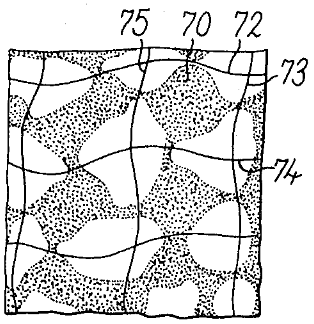
FIG. 9 is a plan view, similar to FIG. 8 but showing the memory with a magnetic field applied such as to change the state thereof.
Figure 10:
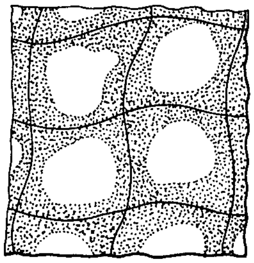
FIG. 10 is a plan view, similar to FIGS. 8 and 9 but after the change of state has taken place.

It should be appreciated that the actual migration of domains illustrated in FIGS. 8 to 10 is unusual and that, when switching takes place, the polarity of magnetisation in the regions which were formally the centres of isolated domains does not change. All that changes is the precise positions of the various domain boundaries.

As an alternative to the sheet of photoconductive material 34 illustrated in FIG. 3, an array of photodiodes may be used. Other methods of read-out may, of course, be employed but in general they will be used to determine the polarity of the connected state since, in these state materials which can be employed to form memories in accordance with the invention, it is the connected state which determines the macroscopic properties.

Another suitable transport magnetic for use in accordance with the invention is $$Eu_{0.6}\ Y_{2.4}\ Ga_{1.1}\ Fe_{3.9}\ O_{12}$$

grown by liquid phase epitaxy on a gadolinium gallium garnet substrate. The epitaxial layer is grown to a thickness of $10\mu m$ and shows an easy direction of magnetisation normal to its surface because of the stress induced by the lattice mismatch between the magnetic garnet and the substrate. In order to form a bubble domain array in this material, a bias field of about a quarter of the saturation flux density is applied together with a pulse field of 0.3 microsecond duration and 1 kHz repetition rate, the amplitude of which is initially greater than the saturation flux density and which is then slowly reduced to zero. With this material, provided subsequent switching fields are normal to the plane of the epitaxial layer and do not contain radial components, no special precautions need be taken to inhibit domain boundary migration, the domain array being stable.

I claim:

1. A memory device comprising a material existing in two stable states side by side and having a plurality of storage regions each storing a binary bit, each region comprising isolated domains of one of said states in a continuous domain of the other state and capable of existing with either state forming the continuous domain to represent a bit, selectively operable means operative in each of said storage regions for causing the material in one or other of said states to form the continuous domain, and detector means for determining for which of said two states there is a continuous domain between two predetermined locations in each storage region.

2. A memory device comprising a sheet of magnetic material having an easy direction of magnetisation normal to the surface of the sheet and having a plurality of storage regions each storing a binary bit, each region comprising isolated domains of one polarity in a continuous domain of the opposite polarity, means for selectively applying a magnetic field to each of said storage regions, and detector means for determining for which of said two states there is a continuous domain between two predetermined locations in each storage region.

3. Apparatus as claimed in claim 2 in which the means for selectively applying a magnetic field to discrete areas of said material, comprises a matrix of wires disposed on the surface of the magnetic material whereby a magnetic field may be applied to a selected area by co-incident-current addressing.

4. A memory device as claimed in claim 2, in which the magnetic material is transparent and the detector means incudes means for forming an image in polarised light of one of said discrete areas thereof.

5. A memory device as claimed in claim 4, in which the detector means incudes means for projecting said image in polarised light on to a photoconductive sheet and means for detecting whether the electrical resistance across said sheet exceeds a threshold value.

* * * * *